United States Patent [19]

Funami et al.

[11] Patent Number: 5,055,653
[45] Date of Patent: Oct. 8, 1991

[54] LASER BEAM MACHINING DEVICE

[75] Inventors: Koji Funami, Moriguchi; Yuji Uesugi, Osaka; Yukio Nishikawa, Ikeda, all of Japan

[73] Assignee: Matsushita Electric Industrial Co., Ltd., Osaka, Japan

[21] Appl. No.: 515,492

[22] Filed: Apr. 30, 1990

[30] Foreign Application Priority Data

May 8, 1989 [JP] Japan .................................. 1-114706

[51] Int. Cl.⁵ .............................................. B23K 26/06
[52] U.S. Cl. ........................... 219/121.75; 219/121.77; 219/121.74
[58] Field of Search ...................... 219/121.73, 121.74, 219/121.75, 121.69, 121.68, 121.77, 121.61

[56] References Cited

FOREIGN PATENT DOCUMENTS 1765145 2/1972 Fed. Rep. of Germany ........................ 219/121.77
0008594 1/1977 Japan ............................. 219/121.77

OTHER PUBLICATIONS

M. A. Grimm, *IBM Technical Disclosure Bulletin*, "Optical System for Laser Machining of Narrow Slots", vol. 14, No. 9, Feb. 1972, pp. 2641, 2642.

*Primary Examiner*—C. L. Albritton
*Attorney, Agent, or Firm*—Ratner & Prestia

[57] ABSTRACT

A laser beam machining device having aspherical lenses for uniformity of the cross section intensity of a laser beam emitted from a laser oscillator, and converging optical unit composed of a plurality of converging lenses disposed to be aligned in single or plural rows on a plane in the optical path of the uniform laser beam, whereby uniform machining can be performed in the middle and at the edges of the machining area and the allowable machining area can be made wider.

7 Claims, 10 Drawing Sheets

LASER BEAM MACHINING DEVICE

BACKGROUND OF THE INVENTION

1. Field of the Invention

This invention relates to a laser beam machining device.

2. Description of the Prior Art

FIG. 10 shows a conventional X-Y table type laser beam machining device, in which a laser beam 2 emitted from a laser beam oscillator 1 is deflected 90 degrees and irradiated on a workpiece 9 by the converging lenses 11b. The workpiece 9 is moved by the X-Y table 10 and machined in a prescribed way.

FIG. 11 shows a conventional galvanometer type beam scanning device which is a laser beam machining device, in which a laser beam 2 emitted from a laser oscillator 1 is irradiated on a workpiece 9 by an $f\theta$ lens 17 while scanning a plane by means of two galvanomirrors 16 moved by a galvanometer 15.

However, the above-mentioned method that uses one laser beam so as to form a machining mark requires much time and is not productive when the same machining must be repeated on the workpiece 9. Therefore, laser beam machining devices such as that shown in FIG. 12 are often used, which are capable of machining at multiple points on a workpiece. The laser beam machining device of FIG. 12 has convex lenses 3b and 4b for enlarging the beam diameter of a laser beam 2a, and convex cylindrical lenses 5 and 6 for shaping the cross section shape of the laser beam 2d, and a converging optical unit 8 with planoconvex lenses 11. The laser beam 2a emitted from the laser oscillator 1 passes through the convex lens 3b, by which the laser beam 2a is converged and then diverged. Then, it passes through the convex lens 4b with a longer focal length than the convex lens 3b, resulting in a laser beam 2d with a uniform beam diameter larger than that of the laser beam 2a. The laser beam 2d is converged and then diverged horizontally by the convex cylindrical lens 5 and then passes through the convex cylindrical lens 6 which has a longer focal length than the convex cylindrical lens 5, resulting in a parallel laser beam 2e that is diverged horizontally wider than the laser beam 2d. The laser beam 2e is directed to the converging optical unit 8 by a reflecting mirror 7, and by each of the planoconvex lenses 11 of the converging optical unit 8, the laser beam 2e is then converged onto the workpiece 9, resulting in multiple spots on the workpiece 9. The workpiece 9 is moved by the X-Y table 10 to perform a prescribed machining.

Generally, the cross section intensity distribution of a laser beam emitted by solid state lasers (e.g., Nd-YAG lasers, etc.) or gas lasers (e.g., CO2 lasers, etc.) is not uniform and demonstrates a Gaussian distribution such as that of FIG. 13a. Moreover, the cross section intensity distribution of the laser beam 2e still demonstrates a Gaussian distribution even after the beam diameter of the laser beam 2a is diverged or the shape of the beam's cross section is changed in other ways. That is, as shown in FIG. 13a, the intensity of the laser beam 2e is highest at its center and decreases exponentially toward its edges.

Moreover, when a laser beam 2e with this kind of Gaussian distribution is converged by the converging optical unit 8 that is composed of planoconvex lenses 11 and irradiated on the workpiece 9 into multiple spots, the laser energy density (laser beam intensity per unit area) at each of the machining spots 12 also demonstrates a Gaussian distribution because it is the highest in the middle of the laser beam and lower toward the edges of the laser beam.

FIG. 13b shows the relationship between the machining condition range and the allowable machining area with respect to the laser beam intensity, in which the hatched area indicates the energy levels of the laser beam 2e that can be used effectively in machining. The remaining areas indicate the energy levels that cannot be used effectively in machining. Since the cross section intensity distribution of the laser beam 2e is not uniform and has a Gaussian distribution, the allowable machining area is limited by the machining condition range of the laser beam intensity, so all of the energy of the laser beam 2e cannot be used effectively in machining. For example, consider a machining case wherein a laser beam continuously emitted from a YAG laser is pulsed by a Q switch and irradiated on a vapor deposition film with a 1000-Å-thick Al layer in such a way that only the upper Al layer of the film is removed without damaging the film. By performing this machining using the laser beam machining device shown in FIG. 12, the film was damaged when the laser energy density exceeds $2 \times 10^3$ J/cm$^2$, and the Al layer on the deposition film was not removed when it dropped below $1.6 \times 10^3$ J/cm$^2$. That is, the machining condition range for the laser energy density is extremely narrow, $1.6 \times 10^3 - 2 \times 10^3$ J/cm$^2$, so that the allowable machining area becomes small and only about 30 percent of the total energy of the laser beam can be effectively used.

SUMMARY OF THE INVENTION

The laser beam machining device of this invention, which overcomes the above-discussed and numerous other disadvantages and deficiencies of the prior art, comprises a laser oscillator, aspherical lenses for uniformity of the cross section intensity of a laser beam emitted from said laser oscillator, and a converging optical unit that comprises converging lenses disposed to be aligned in single or plural rows on a plane in the optical path of the uniform laser beam.

In one embodiment, the aspherical lenses are composed of first and second aspherical lenses, said first aspherical lens diverging the center of the beam where the beam intensity is high and not diverging the edges of the beam where the beam intensity is low, so that the beam intensity becomes uniform, and said second aspherical lens returning said diverged beam to a parallel beam.

The cross section intensity distribution of a laser beam with a Gaussian distribution is made uniform by using an aspherical lens, and this uniform laser beam is irradiated on a workpiece into multiple spots by a converging optical unit composed of several converging lenses. Since the intensities of parts of the laser beam incident on the converging lenses are equal to each other, the laser energy densities at the machining spots converged by the converging lenses are also equal to each other. Therefore, uniform machining can be performed in the middle and at the edges of the machining area. Moreover, since the majority of the laser beam energy can be used effectively for machining, the allowable machining area can be made wider.

Alternatively, the laser beam machining device of this invention comprises a laser oscillator, aspherical mirrors for uniformity of the cross section intensity of a laser beam emitted from said laser oscillator, and a converging optical unit that comprises converging lenses disposed to be aligned in single or plural rows on a plane in the optical path of the uniform laser beam.

Aspherical mirrors are used in place of the above-mentioned aspherical lenses that convert a Gaussian distribution of the cross section intensity distribution to a uniform distribution, and the same effect as the mentioned-above can be attained.

Alternatively, the laser beam machining device of this invention comprises a laser oscillator and a converging optical unit that comprises converging lenses disposed to be aligned in single or plural rows on a plane in the optical path of a laser beam emitted from said laser oscillator, the shapes of said converging lenses being set such that the energy levels of parts of the laser beams incident on said converging lens become equal.

In one embodiment, the converging lenses are composed of planoconvex lenses, the sizes of said planoconvex lenses positioned in the middle of said converging optical unit being set to be small and the sizes of said planoconvex lenses positioned near the edges of said converging optical unit being set to be large.

The energy levels of parts of the laser beam incident on the converging lenses are made equal by varying the shape (e.g., size and position of optical axis) of each of the converging lenses in the converging optical unit depending upon the cross section intensity distribution of the laser beam, and the same effect as the mentioned-above can be also attained.

Alternatively, the laser beam machining device comprises a laser oscillator, a beam splitter that evenly splits the energy of a laser beam emitted from said laser oscillator, and a converging optical unit that comprises converging lenses disposed to be aligned in single or plural rows on a plane in the optical path of the laser beam split by said beam splitter.

In one embodiment, the beam splitter is composed of a plurality of prisms, the cross section areas of which are different from each other so that the energy levels of parts of the laser beam incident on said prisms becomes equal, each of said prisms being positioned at an angle to the optical axis of the corresponding part of said laser beam so that said laser beam is refracted to the outside as it enters into said prisms and then to the inside as it leaves said prisms, and the lengths of said prisms being set so that the laser beams that have passed through said prisms can be incident on said converging lenses of said converging optical unit.

The energy levels of parts of the laser beam incident on the converging lenses are made equal by using a beam splitter to evenly split the laser beam energy, and the same effect as the mentioned-above can be also attained.

Thus, the invention described herein makes possible the objectives of (1) providing a laser beam machining device by which the energy levels of parts of a laser beam incident on converging lenses that constitute a converging optical unit are made equal, and each part of the laser beam is perpendicularly incident on the optical axis of the corresponding converging lens, so the energy densities of the parts of the laser beam converged into multiple spots by the converging lenses at the points to be machined are equal, which makes it possible to perform uniform machining in the middle and at the edges of the machining area; and (2) providing a laser beam machining device by which the majority of the laser beam energy can be effectively used, so that the allowable machining area can be widened.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Example 1

Figure 1:
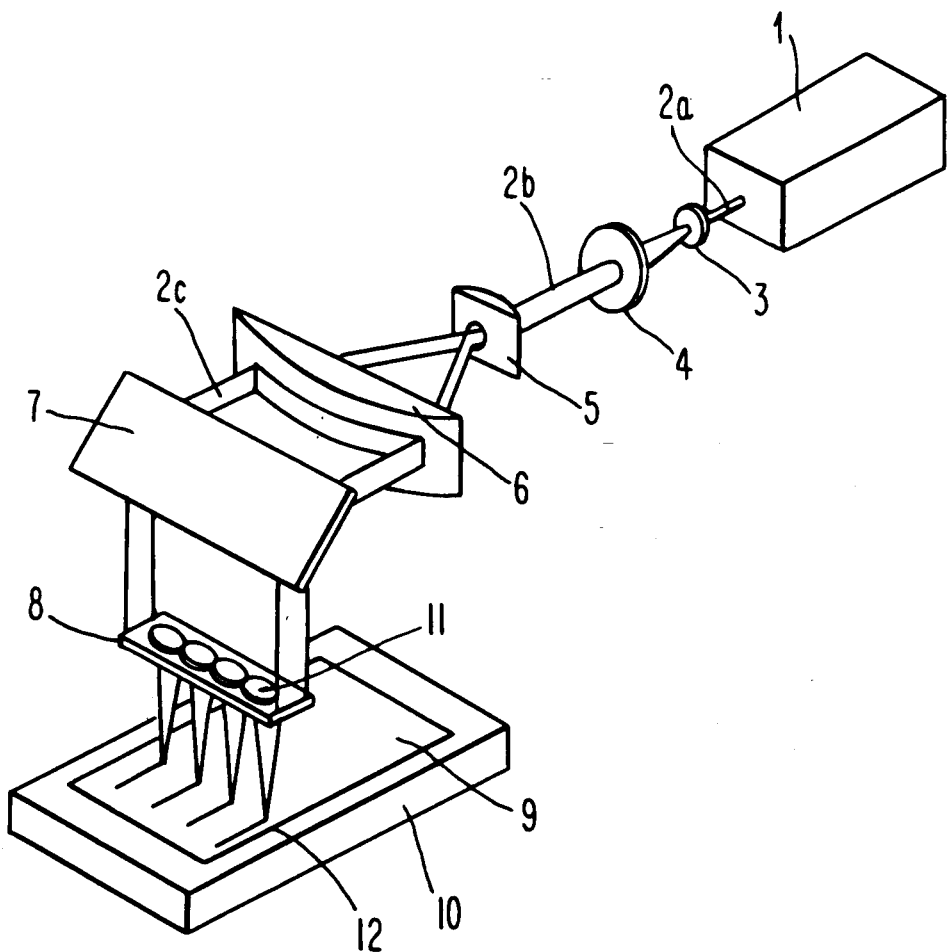
FIG. 1 is a schematic diagram showing a laser beam machining device of this invention.

FIG. 1 shows a laser beam machining device of this invention, which comprises a laser beam oscillator 1, aspherical lenses 3 and 4 for uniforming the cross section intensity distribution of a laser beam 2a emitted from the laser beam oscillator 1, convex cylindrical lenses 5 and 6 for changing the cross section shape of the laser beam 2b, a total reflection mirror 7 and a converging optical unit 8 composed of a plurality of planoconvex lenses 11 which are typical converging lenses. Reference numeral 9 is a workpiece disposed on an X-Y table 10.

This laser beam machining device operates as follows: The cross section intensity distribution of the laser beam 2a emitted from the laser beam oscillator 1 is changed from a Gaussian distribution to a uniform distribution by the aspherical lenses 3 and 4 while retaining the parallelism of the laser beam 2a. The uniform laser beam 2b is horizontally converged and then horizontally diverged by the convex cylindrical lens 5 and then becomes a parallel laser beam 2c that is diverged by the convex cylindrical lens 6 which has a longer focal length than the convex cylindrical lens 5, the laser beam 2c being horizontally wider than the laser beam 2b. The laser beam 2c is directed to the converging optical unit 8 by the reflecting mirror 7, and the planoconvex lenses 11 of the converging optical unit 8 converge the laser beam 2c into multiple spots on the workpiece 9. The workpiece 9 is moved by the X-Y table 10 to perform a prescribed machining.

Figure 2:
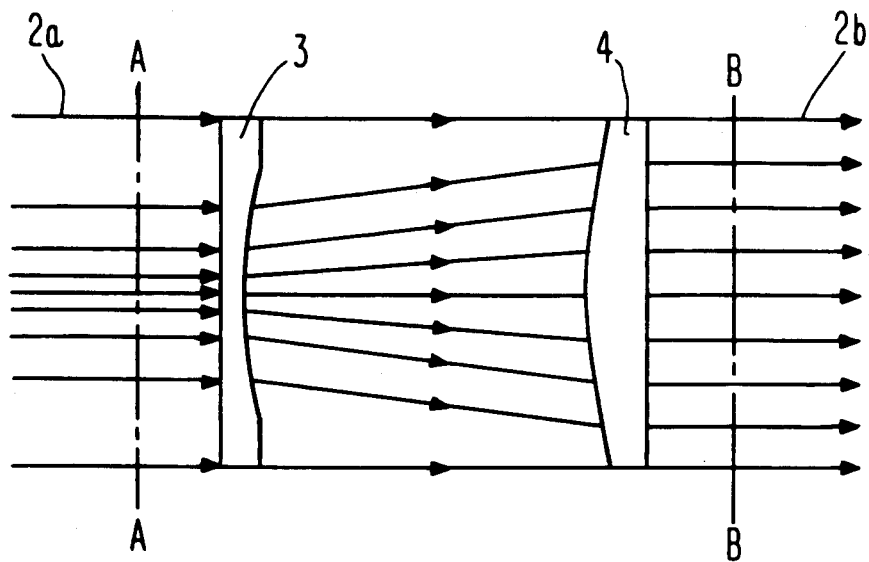
FIG. 2 is a schematic diagram showing the aspherical lens optical system in the laser beam machining device of FIG. 1
Figure 3A:
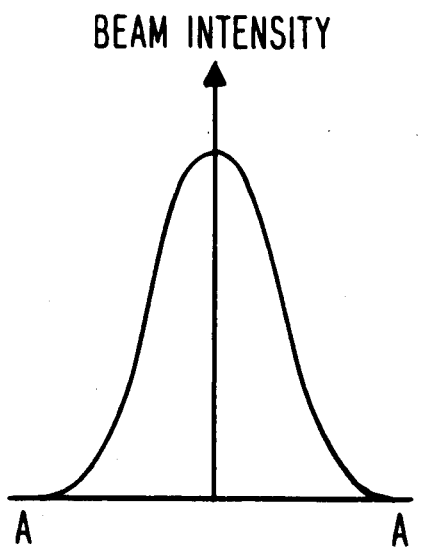
FIGS. 3a and 3b, respectively, are graphs showing the cross section intensity distributions of a laser beam before and after passing through an aspherical lens optical system.
Figure 3B:
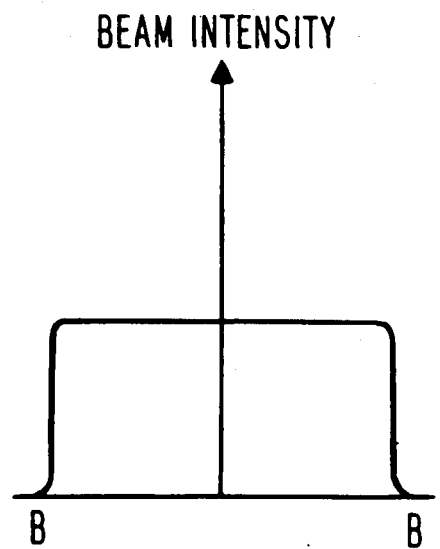

The function of the aspherical lenses 3 and 4 which convert the cross section intensity distribution of the laser beam 2a from a Gaussian distribution to a normal distribution is described below: FIG. 2 shows an optical system comprising the aspherical lenses 3 and 4 in the laser beam machining device of FIG. 1, in which the intensity distribution of the laser beam is indicated by the density of solid lines. On the aspherical surface of the aspherical lens 3, the center of the beam, where the beam intensity is high, is diverged and the edges of the beam, where the beam intensity is low, is not diverged, so that the beam intensity on the aspherical surface of the aspherical lens 4 becomes uniform. On the aspherical surface of the aspherical lens 4, however, the diverged beam is returned to a parallel beam. FIG. 3a shows the beam intensity at the cross section A—A of the laser beam 2a with a Gaussian distribution, and FIG. 3b shows the beam intensity at the cross section B—B of the laser beam 2b with a normal distribution. This uniform laser beam 2b is converged by the planoconvex lenses 11 in the converging optical unit 8, and when it is irradiated on the workpiece 9 into multiple spots, the energy densities at the machining spots 12 are all the same.

Figure 4A:
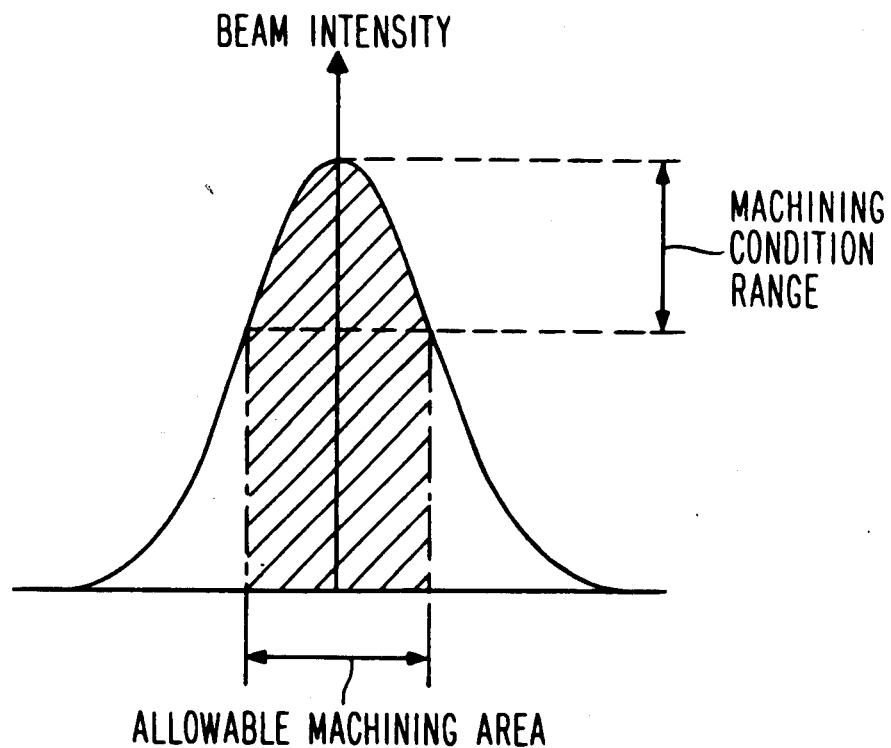
FIG. 4a is a graph showing the relationship between the machining condition range and the allowable machining area of the laser beam intensity with respect to the laser beam machining device of FIG. 1.
Figure 4B:
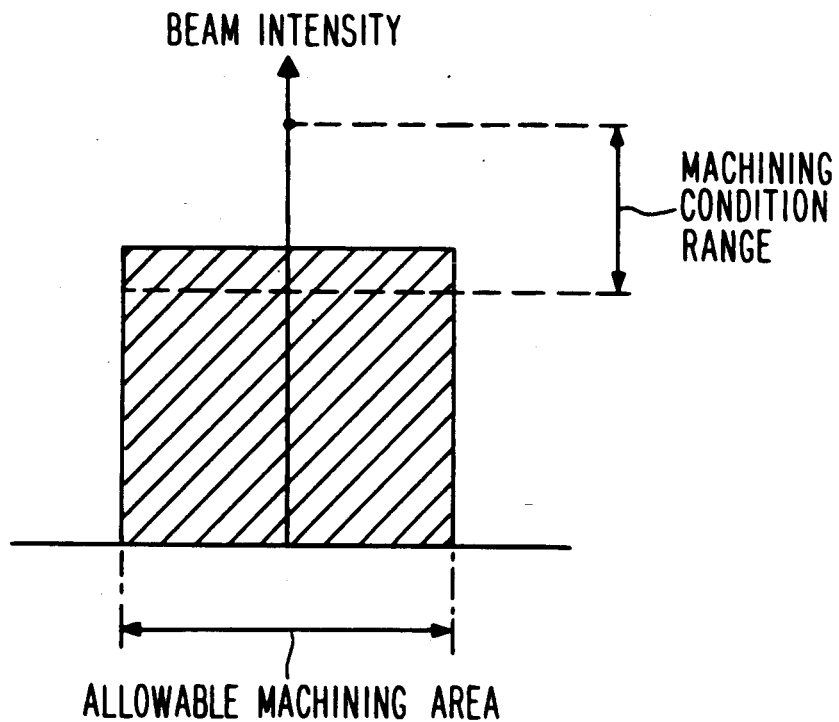
FIG. 4b is a graph showing the relationship between the machining condition range and the allowable machining area of the laser beam intensity with respect to a conventional laser beam machining device.

FIGS. 4a and 4b, respectively, show the relationships between the machining condition range and the allowable machining area with respect to the laser beam intensity for a conventional laser beam machining device and the laser beam machining device of this example, in which the hatched areas indicate the energy levels of the laser beam that can be used effectively in machining.

As mentioned above, the cross section intensity distribution of the laser beam 2a is made uniform by the use of aspherical lenses 3 and 4. The uniform laser beam is converged by planoconvex lenses 11 and irradiated on the workpiece 9 into multiple spots, so that the laser energy densities at the corresponding spots are equal, which makes it possible to perform uniform machining in the middle and at the edges of the beam. Moreover, the majority of the laser beam energy is effectively used in machining so that the allowable machining area can be widened.

Example 2

Figure 5:
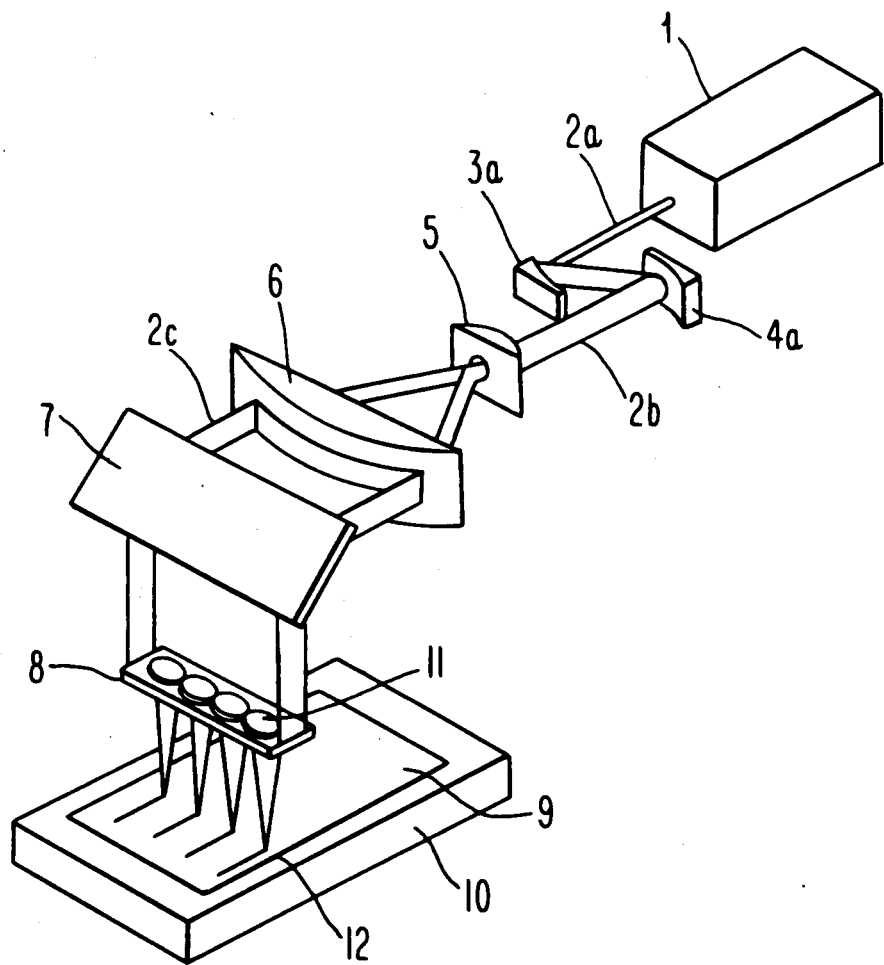
FIG. 5 is a schematic diagram showing another laser beam machining device of this invention.

FIG. 5 shows another laser beam machining device of this invention, which has the same structure as that of FIG. 1, except that aspherical mirrors 3a and 4a are used in place of the aspherical lenses 3 and 4.

Since the function of the laser beam machining device of this example is nearly the same as that of Example 1, except that the means for converting the cross section intensity distribution of the laser beam 2a from a Gaussian distribution to a uniform distribution is changed from the aspherical lenses 3 and 4 to the aspherical mirrors 3a and 4a, this example produces nearly the same effect as Example 1.

Example 3

Figure 6:
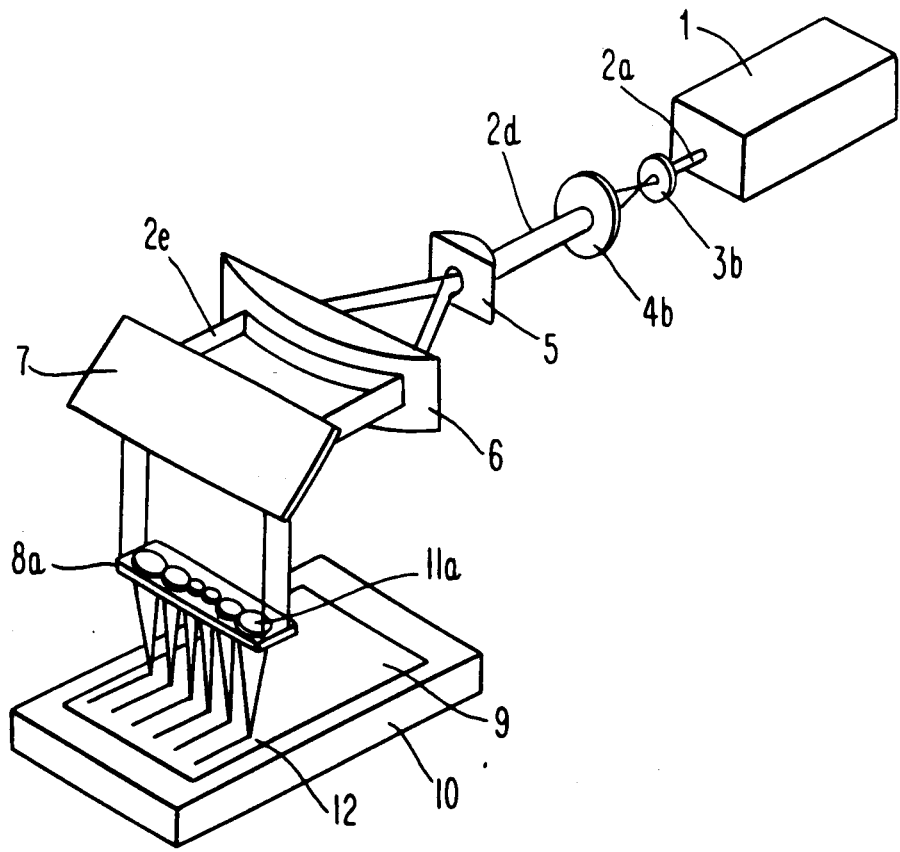
FIG. 6 is a schematic diagram showing still another laser beam machining device of this invention.
Figure 7:
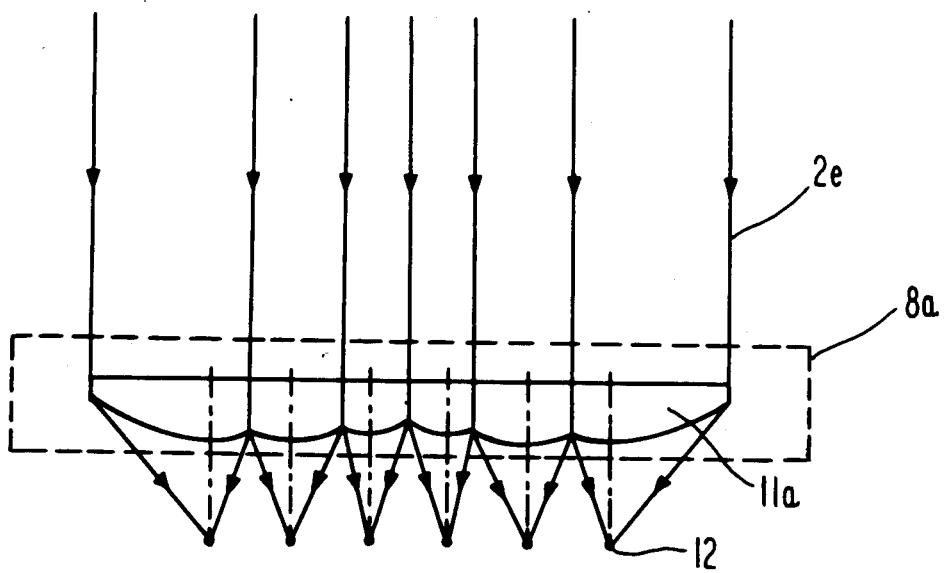
FIG. 7 is a schematic diagram showing the converging optical unit of the laser beam machining device of FIG. 6.

FIG. 6 shows still another laser beam machining device of this invention, which has the same structure as that of FIG. 1, except in two respects. One of which is the use of spherical convex lenses 3b and 4b instead of the aspherical lenses 3 and 4, so the laser beam 2a emitted from the laser oscillator 1 is converged and then diverged after it passes through the convex lens 3b, and then becomes a parallel laser beam 2d with a diameter greater than that of the laser beam 2a by the convex lens 4b which has a focal length greater than the convex lens 3b. Note here that the cross section intensity distribution of the laser beam 2d is not a uniform distribution such as that of Example 1, but it is still a Gaussian distribution. The other respect is the converging optical unit 8a. FIG. 7 is a schematic diagram showing the converging optical unit 8a of Example 3, which comprises six planoconvex lenses 11a. The intensity distribution of the beam is indicated by the density of solid lines.

The function of the converging optical unit 8a is described below in reference to FIG. 7: First, the cross section intensity distribution of the laser beam 2e incident on the converging optical unit 8a is not a uniform distribution but rather a Gaussian distribution. Therefore, the shapes of the six planoconvex lenses 11a in the converging optical unit 8a are fixed depending upon the beam intensity distribution of the laser beam 2e. That is, in order to make the energy levels of the laser beam 2e incident on the respective planoconvex lenses 11a equal, the sizes (i.e., cross section area) of the planoconvex lenses 11a are varied. Since the intensity is highest in the middle and lower near the edges in a Gaussian distribution, the sizes of the planoconvex lenses 11a positioned in the middle area of the optical unit 8a are set to be small and the sizes of the planoconvex lenses 11a positioned near the edges of the optical unit 8a are set to be large. Moreover, as indicated by the dashed line in FIG. 7, the optical axes of the planoconvex lenses 11a meet the corresponding machining points 12 so the laser beam 2e is converged by the planoconvex lenses 11a on a workpiece into multiple spots corresponding to the points 12 to be machined on the workpiece.

Therefore, the laser energy densities at the points 12 to be machined are equal, and uniform machining is performed in the middle and at the edges, and this example also attains the same effect as Example 1.

Example 4

Figure 8:
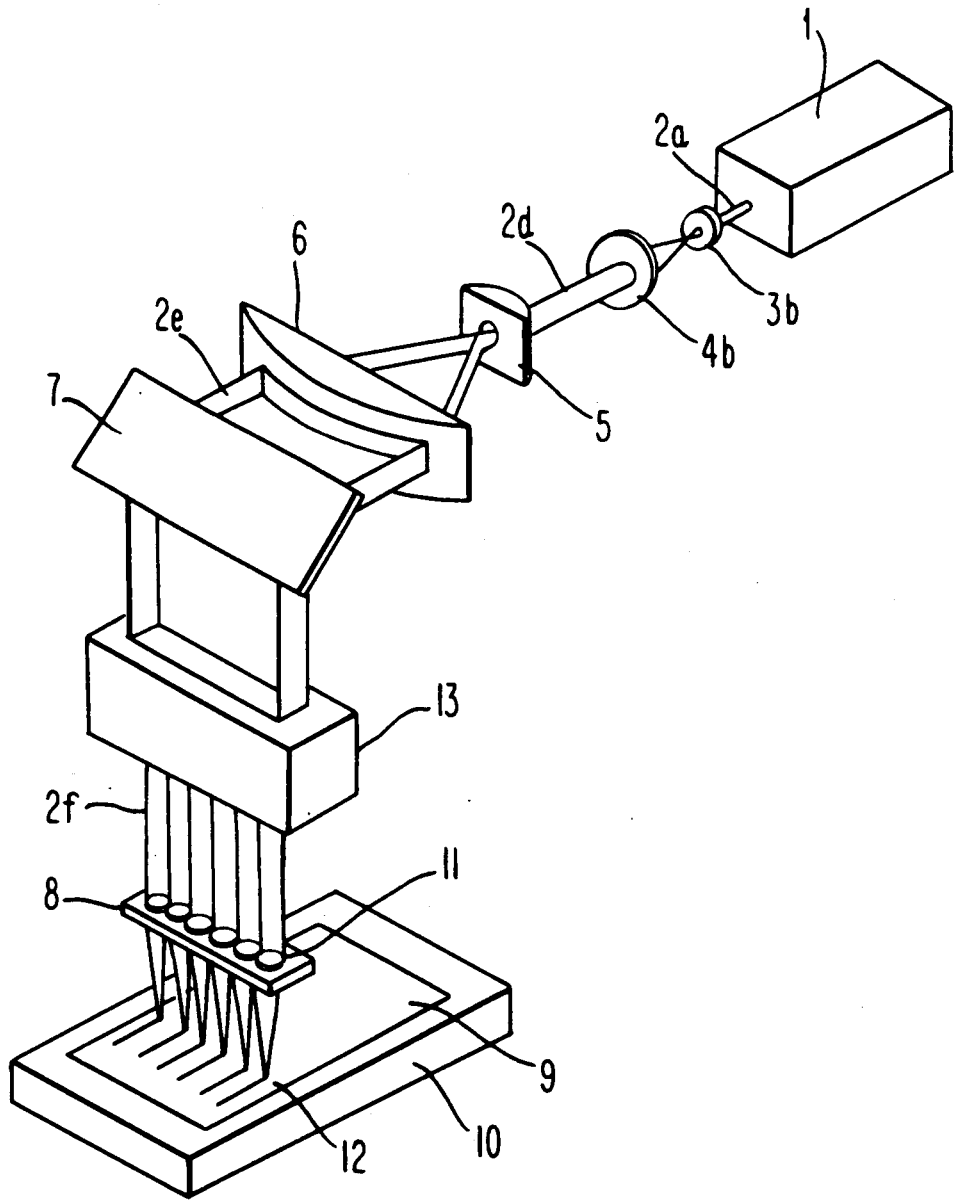
FIG. 8 is a schematic diagram showing still another laser beam machining device of this invention.
Figure 9:
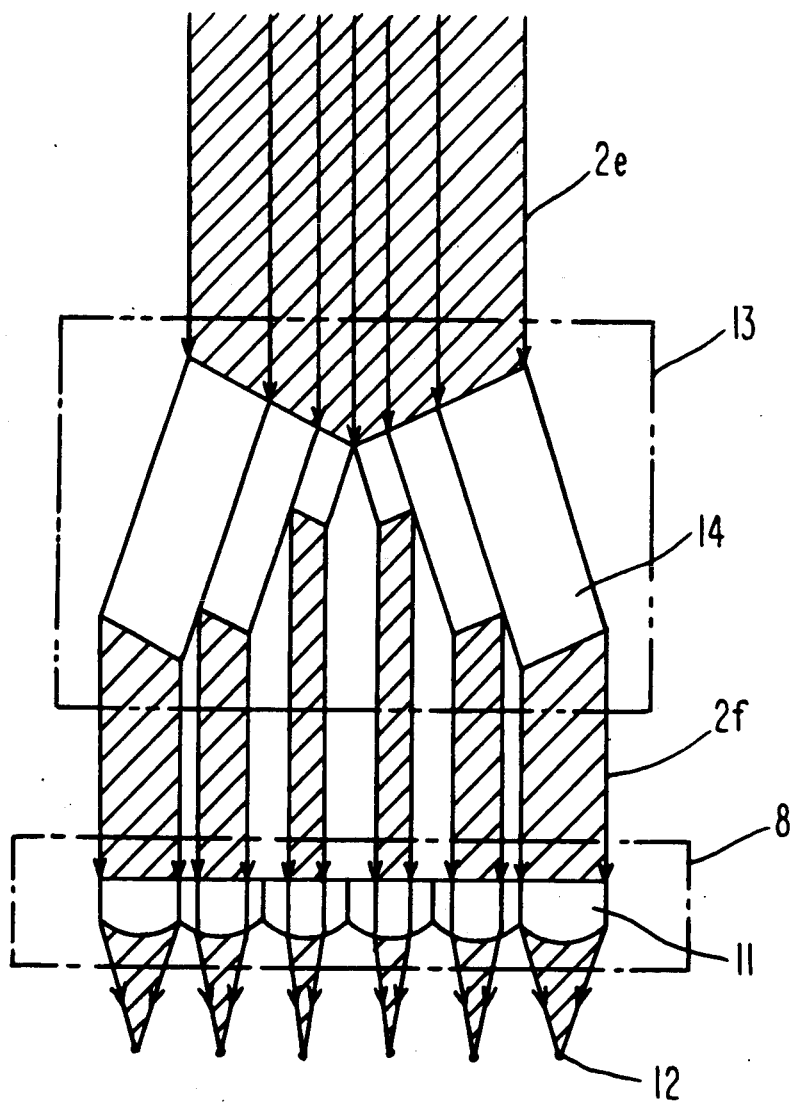
FIG. 9 is a schematic diagram showing the beam splitting unit and converging optical unit of the laser beam machining device of FIG. 8.
Figure 10:
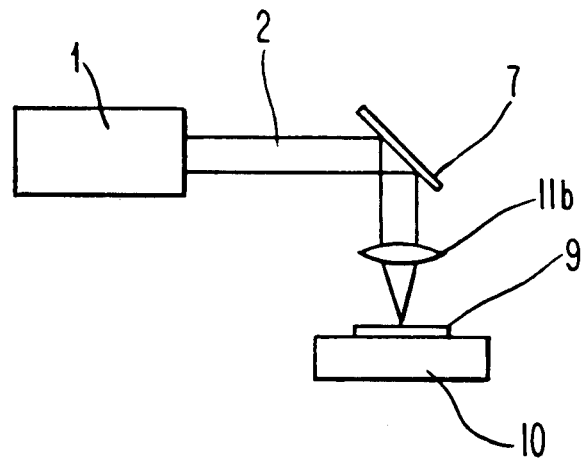
FIG. 10 is a schematic diagram showing a conventional X—Y table type laser beam machining device.
Figure 11:
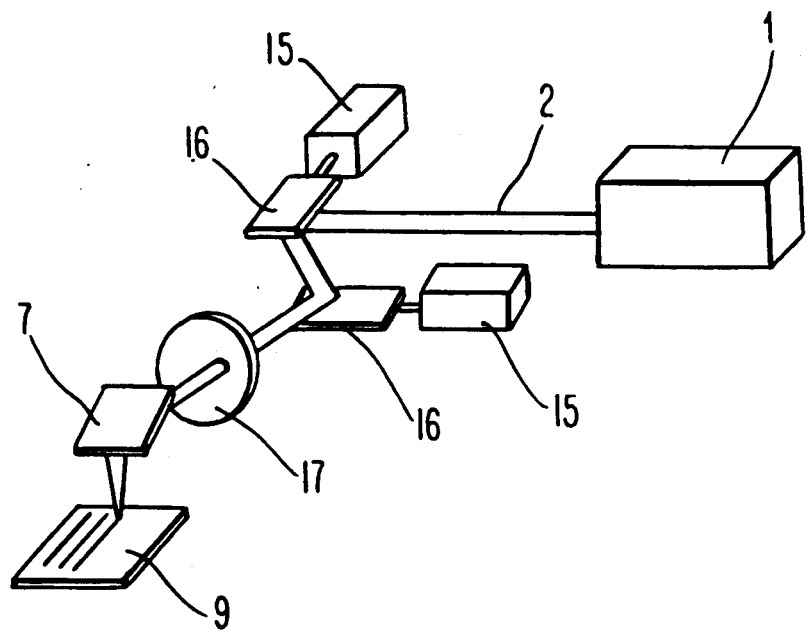
FIG. 11 is a schematic diagram showing a galvanometer type beam scanning device which is a conventional laser beam machining device.
Figure 12:
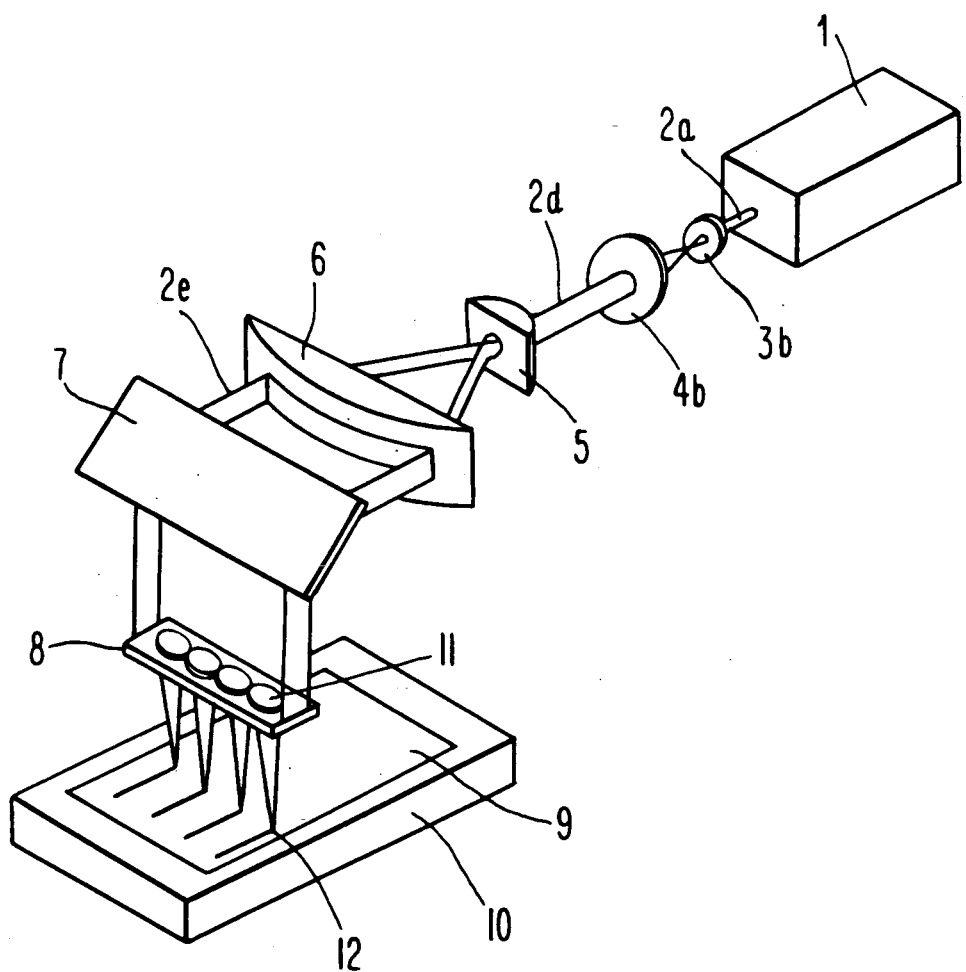
FIG. 12 is a schematic diagram showing a conventional laser beam machining device capable of simultaneous multiple-point machining.
Figure 13A:
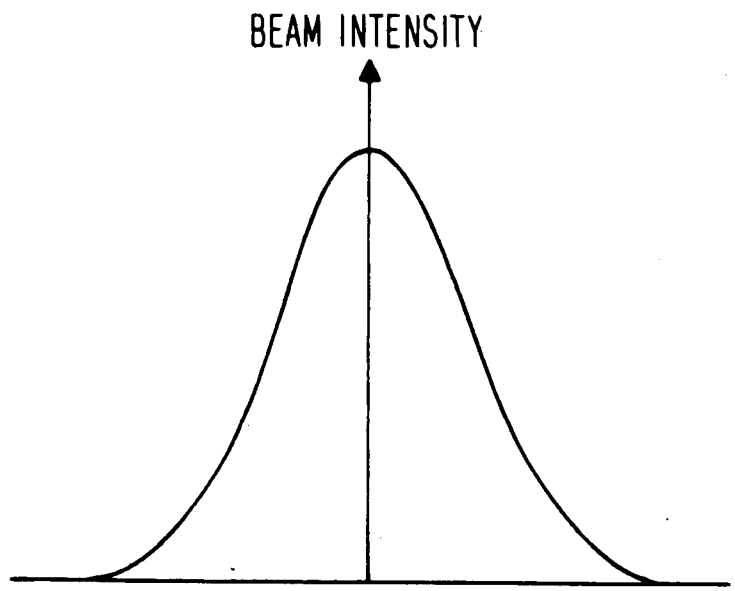
FIGS. 13a and 13b, respectively, are graphs showing the Gaussian distribution of a laser beam and the relationship between the machining condition range and the allowable machining area with respect to the laser beam intensity in the case where the conventional laser beam machining device of FIG. 12 is used.
Figure 13B:
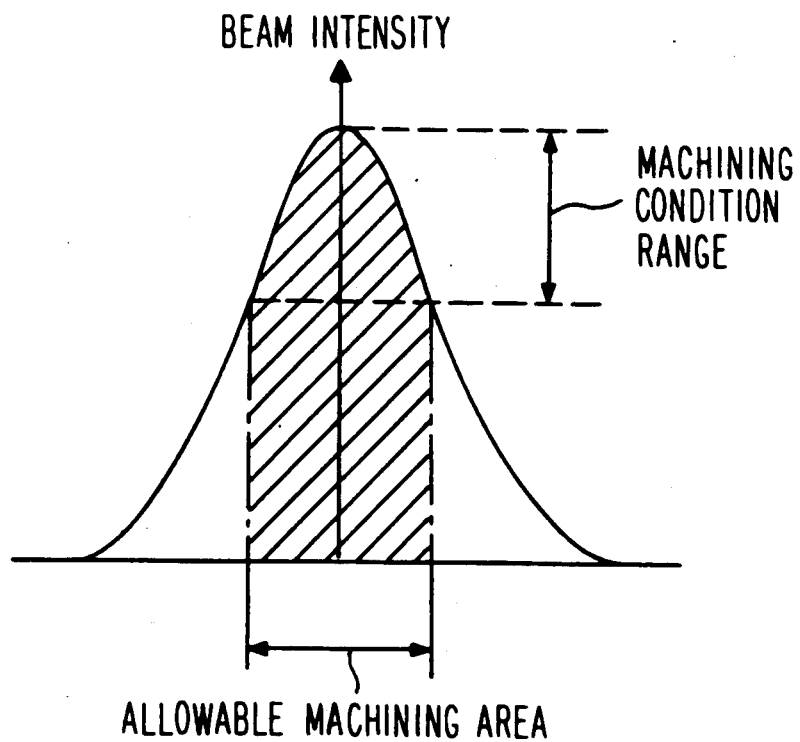

FIG. 8 shows still another laser beam machining device of this invention, which has the same structure as that of FIG. 1, except in two respects, the first is the use of spherical convex lenses 3b and 4b instead of the aspherical lenses 3 and 4. This example is the same as Example 3 in this respect, so their description is omitted. The other respect is that a beam splitter unit 13 is positioned between the reflection mirror 7 and the converging optical unit 8, the beam splitter 13 splitting the energy of the laser beam 2e evenly. FIG. 9 shows the converging optical unit 8 composed of six planoconvex lenses 11 and the beam splitter unit 13 composed of six prisms 14, in which the hatched areas indicates the areas through which the laser beam 2e passes.

The function of this beam splitter unit 13 is described with reference to FIG. 9. The cross section intensity distribution of the laser beam 2e incident on the beam splitter unit 13 is a Gaussian distribution, and the sizes of the six prisms 14 of the beam splitter unit 13 are fixed depending upon the beam intensity distribution of the laser beam 2e. That is, in order to make the energy levels of parts of the laser beam 2e incident on the prisms 14 equal, the sizes (i.e., cross section area) of the prisms are different from each other. Moreover, since each of the prisms 14 is positioned at an angle to the optical axis of the corresponding part of the laser beam 2e, the laser beam 2e is refracted to the outside as it enters into the prisms 14 and then to the inside as it leaves the prisms 14. The lengths of the prisms 14 are set so that the laser beams 2f that have passed through them are incident on the planoconvex lenses 11 of the converging optical unit 8.

Therefore, the laser energy levels of the laser beams 2f incident on the planoconvex lenses 11 are equal and the laser energy densities at the machining spots 12 are equal. Accordingly, this example also produces the same effect as Example 1.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A laser beam machining device comprising a laser oscillator, aspherical lenses for uniforming the cross section intensity of a laser beam emitted from said laser oscillator, and a converging optical unit that comprises converging lenses disposed to be aligned in single or plural rows on a plane in the optical path of the uniform laser beam.

2. A laser beam machining device according to claim 1, wherein said aspherical lenses are composed of first and second aspherical lenses, said first aspherical lens diverging the center of the beam where the beam intensity is high and not diverging the edges of the beam where the beam intensity is low, so that the beam intensity becomes uniform, and said second aspherical lens returning said diverged beam to a parallel beam.

3. A laser beam machining device comprising a laser oscillator, aspherical mirrors for uniforming the cross section intensity of a laser beam emitted from said laser oscillator, and a converging optical unit that comprises converging lenses disposed to be aligned in single or plural rows on a plane in the optical path of the uniform laser beam.

4. A laser beam machining device comprising a laser oscillator and a converging optical unit that comprises converging lenses disposed to be aligned in single or plural rows on a plane in the optical path of a laser beam emitted from said laser oscillator, the shapes of said converging lenses being set such that the cross sectional areas of parts of the laser beams incident on said converging lenses are different from each other and the energy levels of said parts of the laser beams become equal.

5. A laser beam machining device according to claim 4, wherein said converging lenses are composed of planoconvex lenses, the sizes of said planoconvex lenses positioned in the middle of said converging optical unit being set to be small and the sizes of said planoconvex lenses positioned near the edges of said converging optical unit being set to be large.

6. A laser beam machining device comprising a laser oscillator, a beam splitter that splits a laser beam emitted from said laser oscillator into several laser beams whose cross sectional areas are different from each other and whose energies are equal, and a converging optical unit that comprises converging lenses disposed to be aligned in single or plural rows on a plane in the optical path of the laser beam split by said beam splitter.

7. A laser beam machining device according to claim 6, wherein said beam splitter is composed of a plurality of prisms, the cross section areas of which are different from each other so that the energy levels of parts of the laser beam incident on said prisms become equal, each of said prisms being positioned at an angle to the optical axis of the corresponding part of said laser beam so that said laser beam is refracted to the outside as it enters into said prisms and then to the inside as it leaves said prisms, and the lengths of said prisms being set so that the laser beams that have passed through said prisms can be incident on said converging lenses of said converging optical unit.

* * * * *